United States Patent [19]

Farris et al.

[11] Patent Number: 5,320,374
[45] Date of Patent: Jun. 14, 1994

[54] SUSPENSION FORK

[75] Inventors: Mark S. Farris, Costa Mesa; Michael A. Harrison, Newport Beach; John M. Loftus, Costa Mesa, all of Calif.

[73] Assignee: Cannondale Corporation, Georgetown, Conn.

[21] Appl. No.: 713,673

[22] Filed: Jun. 11, 1991

[51] Int. Cl.$^5$ .............................................. B62K 25/08
[52] U.S. Cl. ....................................... 280/276; 74/492; 188/271; 267/216; 280/283; 280/284; 280/777
[58] Field of Search .............. 280/276, 283, 284, 286, 280/274, 275, 277, 279, 280, 777; 188/322.17, 322.16, 266, 271, 381; 267/202, 216; 74/492; 464/117

[56] References Cited

U.S. PATENT DOCUMENTS

| | | |
|---|---|---|
| 575,152 | 1/1897 | Fogg . |
| 601,978 | 4/1896 | Nevill . |
| 636,726 | 11/1899 | Hindmarsh . |
| 689,970 | 12/1901 | Horack . |
| 723,075 | 3/1903 | Thoms . |
| 846,079 | 3/1907 | Yost . |
| 2,477,748 | 8/1949 | Hutchins . |
| 2,493,342 | 9/1945 | Eldred et al. . |
| 3,208,767 | 9/1965 | Moulton . |
| 3,301,575 | 1/1967 | Ryan et al. . |
| 3,327,814 | 10/1967 | Nickell . |
| 3,459,441 | 8/1969 | Hornsby . |
| 3,797,276 | 3/1974 | Orain . |
| 3,964,765 | 6/1976 | Zenser . |
| 4,254,639 | 3/1981 | Teramachi . |
| 4,509,386 | 4/1985 | Kimberlin . |
| 4,537,374 | 8/1985 | Barnoin et al. . |
| 4,705,491 | 11/1987 | Andersson . |
| 4,815,763 | 3/1989 | Hartmann . |
| 4,898,566 | 2/1990 | Hakansson . |
| 4,971,344 | 11/1990 | Turner . |
| 5,044,648 | 9/1991 | Knapp . |
| 5,074,678 | 12/1991 | Eberle . |

FOREIGN PATENT DOCUMENTS

416260 11/1946 Italy .
295316 11/1928 United Kingdom .

*Primary Examiner*—Mitchell J. Hill
*Attorney, Agent, or Firm*—Lyon & Lyon

[57] ABSTRACT

There is disclosed herein a suspension fork assembly particularly for use with bicycles. The assembly comprises an outer steer tube which is adapted to be mounted in and extend through the head tube of the bicycle frame, and an inner steer tube telescopes within the outer steer tube. A shock absorbing system is provided within the tubes. The inner surface of the outer steer tube and the outer surface of the inner steer tube each have a plurality of axially arranged opposing longitudinal flat sections, such as four on each tube. A plurality of needle bearings are disposed between the tubes on these flat sections. This arrangement, with the needle bearings arranged on the flat sections between the inner and outer tubes, allows the two tubes to freely telescope in and out with respect to one another without any significant static friction, and also serves to transmit the torsional steering force from the outer tube to the inner tube. The needle bearings thus bear radial loads as well as maintain the in line relationship of the outer and inner tubes for rotational forces while allowing the two tubes to freely telescope.

21 Claims, 6 Drawing Sheets

SUSPENSION FORK

The present invention relates to bicycle suspension systems and more particularly to a suspension fork assembly.

BACKGROUND OF THE INVENTION

Various forms of suspension systems have been proposed and developed for bicycles. The most common form of fork suspension system for bicycles is similar to that used on motorcycles and comprises a pair of telescoping assemblies between which the front wheel is mounted. Each telescoping assembly comprises an outer tube, and inner tube which is free to move in and out of the outer tube and is cushioned in some manner, as by springs and/or a hydraulic system. Generally, the outer tubes are connected at the lower ends to the axle of the front wheel of the bicycle, and the upper ends of the inner tubes are connected together in a fashion similar to the usual upper end of a bicycle fork and extend into the head tube of the bicycle frame. A number of examples of suspension forks for bicycles are shown in the February 1991 issue of Mountain Bike Action, particularly beginning at page 32 thereof. Other bicycle suspension arrangements comprise a single telescoping assembly coupled between the front wheel fork and the head tube of the bicycle frame. In either form of suspension, bushings usually are provided between the telescoping tubes to reduce friction.

Riders have found that suspension front forks can benefit handling and improve control, and a front suspension helps the front wheel follow the ground. A front suspension system is desirable for absorbing bumps, and can enable the bicycle to handle better at higher speeds and be more controllable under rough conditions. Although the front suspension systems of many motorcycles provide these features for motorcycles, they are bulky and heavy, and the designs thereof are not readily adaptable to bicycle use.

Several prior art examples of front suspension systems for bicycles are shown in Horack U.S. Pat. No. 689,970 and Moulton U.S. Pat. No. 3,208,767. The Horack system provides a spring suspension, and includes a ball bearing system for allowing both an axial telescoping action and a rotary steering action. The Moulton patent discloses a spline-type spring suspension. Other suspension systems of interest are shown in Thoms U.S. Pat. No. 723,075, Hutchins U.S. Pat. No. 2,477,748, Ryan U.S. Pat. No. 3,301,575, Hornsby U.S. Pat. No. 3,459,441, Zenser U.S. Pat. No. 3,964,765, Hartman U.S. Pat. No. 4,815,763, British Specification U.S. Pat. No. 295316 of Nov. 1928, and Italian Patent No. 416,260 of Nov. 1946.

As is known to those skilled in the art, any form of system using anti-friction bushings and the like have undesirable static friction called "stiction." Because of this, suspension systems using such bushings tend to stick and then suddenly release or move, and the point at which they release gets higher with higher loads (e.g., a higher radial load caused by a braking load). The dual telescoping assembly presently used on some bicycles is essentially an adaptation of motorcycle front suspension technology; however, in addition to the weight and bulkyness problems, the two telescoping assemblies also have to be fixed together in some manner, as through a "U" shaped yoke at the upper ends of the tubes to eliminate the attendant twisting problem that occurs with each telescoping assembly. This generally is not a problem with motorcycles because the suspension fork assembly can be large and bulky so as to overcome this twisting problem. Additionally, there are linkage type systems, such as the aircraft landing gear scissors link, but this involves an additional coupling with its attendant weight, size and complexity.

It is desirable to provide a front suspension system or suspension fork for bicycles, and particularly for light weight bicycles, which can bear a combination of loads comprising very high radial loads (e.g., from front to back) occasioned by braking, bumps and the like, while at the same time providing stable and tight rotational motion in steering of the front wheel through the suspension system from the handlebars.

SUMMARY

The present invention provides an improved form of suspension system in the form of a suspension fork assembly for bicycles. The assembly comprises first and second steer tubes, one fitting and telescoping within the other, with one being coupled at an upper end to a handlebar stem of the bicycle, and the lower end of the other being coupled to the bicycle fork which receives the front wheel of the bicycle. These tubes are mounted in the head tube of the frame of the bicycle, and include a shock absorbing system within these tubes such as an oil-filled spring dampened internal shock absorbing element or system.

Of particular importance are axially extending longitudinal flat sections or "flats" which are provided on opposing surfaces between the two tubes, along with a plurality of free floating needle bearings disposed on these flat sections to all but eliminate stiction. For example, the upper tube is an outer steer tube coupled to the handlebar stem, and the inside surface of this tube has a plurality, preferably four, of longitudinal flat sections provided therein. The lower tube has a like plurality of similar flat sections, and a plurality of needle bearings are arranged normal to the longitudinal axis of these tubes and suitably supported, so that the lower, inner tube can freely telescope in and out of the upper tube to provide the shock absorbing action. In addition to providing minimum friction between the two tubes, the flats and plurality of needle bearings serve to maintain the fixed relationship between the two tubes, and thus between the handlebars, fork and wheel, and function to transmit the torsional or rotary steering action from the handle bars to the fork and front wheel. While some arrangements have been proposed in the past using a plurality of ball bearings between inner and outer members of a suspension system, it has been found that the use of races with ball bearings is not satisfactory for carrying the various radial and torsional loads that occur.

Accordingly, it is a principal object of the present invention to provide a new form of telescoping suspension assembly for a fork.

Another object of this invention is to provide a new form of suspension assembly for bicycles.

A further object of this invention is to provide a bicycle fork suspension assembly which uses a plurality of needle bearings disposed between flat surfaces of mating telescoping tubes.

These and other objects and features of the present invention will become better understood through a consideration of the following description taken in conjunction with the drawings in which:

FIG. 5a is a view of a bearing cage of the assembly of FIG. 2, and FIGS. 5b–5d are cross-sectional views taken along respective lines 5b–5b, 5c–5c and 5d–5d thereof;

DETAILED DESCRIPTION

Figure 1A:
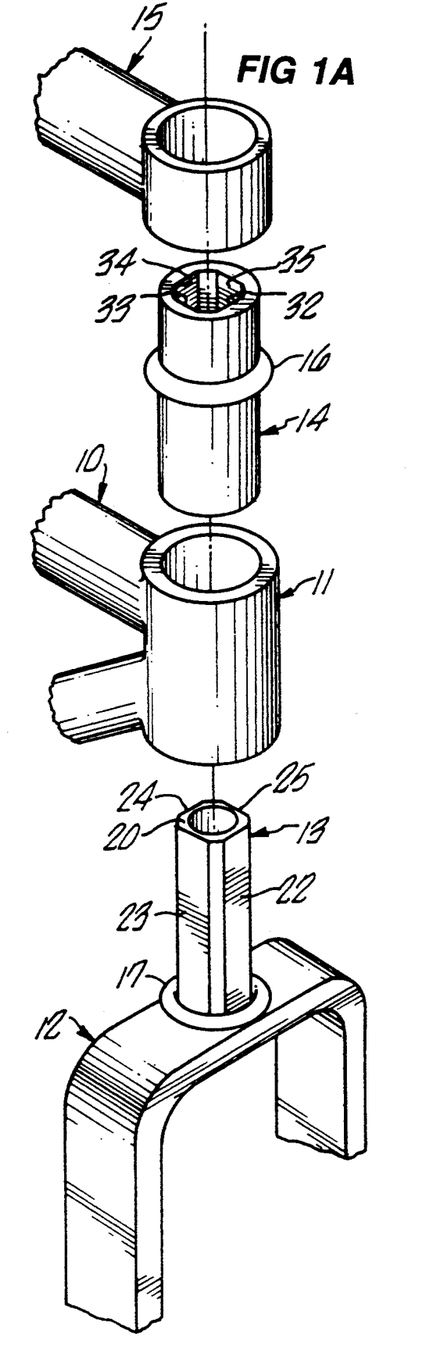
FIG. 1A is a simplified exploded perspective view illustrating a preferred form of suspension fork according to the present invention and FIG. 1B is a detailed view of a portion of the suspension fork of FIG. 1A.
Figure 1B:
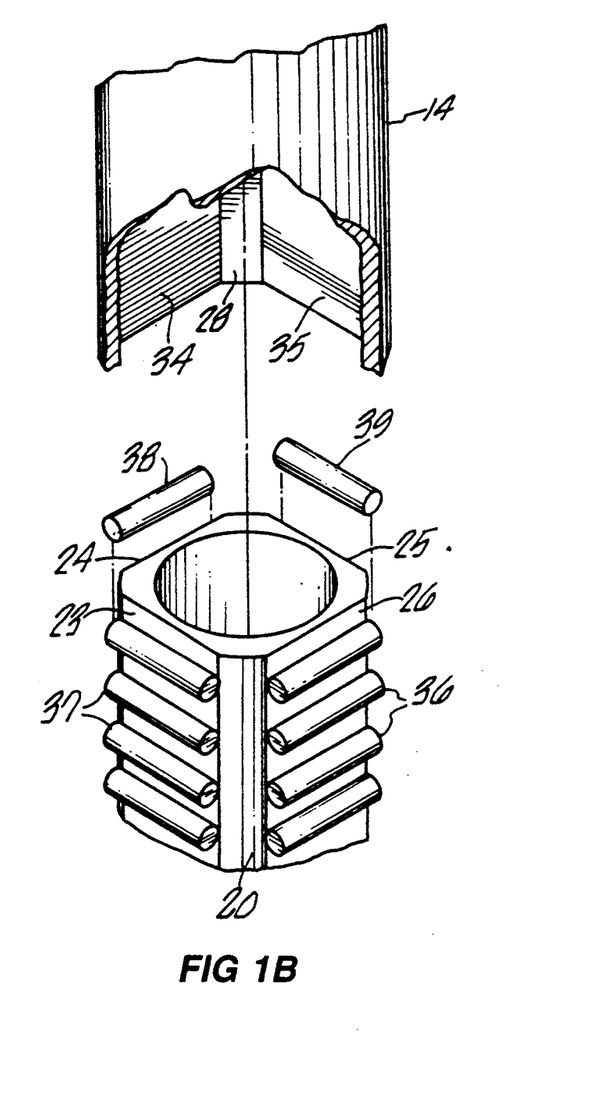

Turning now to the drawings, and first to FIGS. 1A and 1B, a bicycle frame 10 is shown (partial) along with a head tube 11. A fork 12 has an inner steer tube 13 affixed thereto and which extends upwardly through the head tube 11 into an upper outer steer tube 14. The upper end of the outer steer tube 14 is connected to a handlebar stem 15 to which handlebars (not shown) are attached. Upper and lower bearings 16 and 17 can be provided to journal the tube assembly 13–14 within the head tube 11 for steering rotation. The assembly of the tubes 13 and 14 is suitably connected together and retained within the head tube 11, and a suitable hydraulic or air shock system is mounted within these tubes 13–14, all as will become apparent subsequently.

The outer wall 20 of the lower or inner steer tube 13 has a plurality of axially extending longitudinal flat surfaces or "flats" 22–25. Preferably four such flats are provided, although three will suffice and a greater number than four can be used. The inner wall 28 of the upper or outer tube 14 has a like set of opposing flats 32–35. These flats on both tubes extend in the axial directions of the tubes. Four sets of needle bearings 36–39 are disposed between the respective flats of the inner and outer tubes 13–14, as generally illustrated in FIGS. 1A and 1B, and these needle bearings are disposed normal or perpendicular to the axial direction of the tubes 13 and 14, or consequently normal to a radial line extending from the center of the tubes. These needle bearings, which are disposed from the top to the bottom of each flat, are retained in a suitable cage (not shown in FIG. 1B) which will be described later.

It will be apparent to those skilled in the art that the needle bearings 36–39 allow the inner tube 13 to freely slide axially or telescope with respect to the outer tube 14. Additionally, the needle bearings, in conjunction with the associated flats on the tubes 13 and 14, enable the steering torsional or rotary action to be imparted from handlebars connected to the handlebar stem 15 via the telescoping tubes 13 and 14 to the fork 12 and consequently to the front wheel (not shown) supported by the fork. The respective flats and needle bearings bear a combination of loads including very high radial loads from the fork 12 during movement over rough terrain and during braking and the like, while still stabilizing a rotational and torsional connection from the handlebars to the fork. No external coupling or linkage is needed to enable transmission of the rotational and torsional forces for steering, and the present suspension assembly can be made sufficiently strong, light and compact such that a single telescoping assembly can be provided for a bicycle fork without requiring a pair of telescoping assemblies. Sufficient longitudinal or axial travel can be provided, such as several inches. The length of the flats establishes the extent of telescoping action of the tubes. This assembly absorbs bumps, facilitates handling the bicycle while riding, is more controllable over rough conditions, and provides a tight positive steering action.

Figure 2:
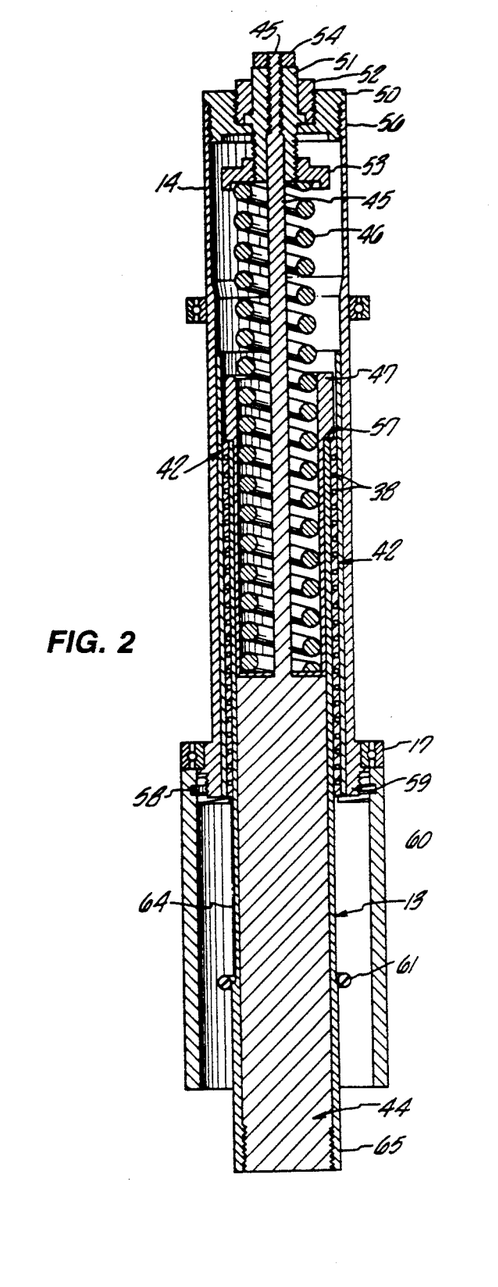
FIG. 2 is a detailed assembly drawing of an embodiment of the present invention, illustrating inner and outer steer tubes and sets of needle bearings arranged therebetween.

Turning now to an detailed discussion of an exemplary embodiment of a suspension fork according to the present invention, FIGS. 2 through 7 illustrate the details of a preferred construction. FIG. 2 is a cross-sectional view of the entire assembly, and FIGS. 3 through 7 illustrate major components thereof in further detail. FIG. 2 illustrates the inner steer tube 13 disposed coaxially within the outer steer tube 14, and shows two sets 36 and 38 of the four sets (36–39) of needle bearings disposed between these tubes. The upper and lower bearings 16 and 17 also are shown coupled to the tube 14 in FIG. 2, and these bearings support the suspension fork assembly within the head tube 11 of FIG. 1A in a conventional manner. FIGS. 3A–3C illustrates the inner steer tube 13 in detail and FIGS. 4A–4D illustrates the outer tube 14 in detail. FIGS. 5A–5D illustrates a bearing cage 42, four of which are used for holding the respective four sets of needle bearings 36–39 between the tubes 13 and 14. FIGS. 6 and 7 illustrate respective fixed and adjustable bearing races which are mounted within the outer steer tube 14 as will be discussed in more detail subsequently.

FIG. 2 also illustrates diagrammatically a hydraulic assembly 44 having a shock carriage assembly 45 and associated coil spring 46 and spring sleeve 47. The hydraulic assembly 44 includes a typical piston and valving arrangement (not shown) to provide an adjustable hydraulic shock action between the tubes 13 and 14.

The upper end at the top end as viewed in FIG. 2) of the outer steer tube 14 is threaded as illustrated for receiving an outer tube cap 50 which in turn receives a jack screw 51 held therein by a retainer screw 52. The lower end (to the left in FIG. 2) of the jack screw 51 has a collar 53 threaded thereon and engages an end of the spring 46. The upper end of the shock carriage 45 is threaded into the jack screw 51 and is secured by a nut 54. Although not shown in FIG. 2, the handlebars stem 15 of FIG. 1A is clamped around the upper end 56 of the outer steer tube 14. The jack screw 51 and associated components are adjustable so as to allow the preload of the hydraulic shock assembly to be adjusted, such as to adjust the same for the rider's weight.

The needle bearing cages 42 and needle bearings 36–39 can be retained between the tubes 13 and 14 in any suitable manner. In the exemplary embodiment illustrated in FIG. 2, the upper end of the spring sleeve 47 includes a shoulder 57 against which the upper end of the bearing cages 42 abut, and the lower ends thereof are retained by a lower collar 58 which is threaded onto the lower end 59 of the outer tube 14. A boot 60 may be attached to the collar 58, and a bottom-out bumper 61 can be provided on the inner tube 13, as shown. The boot minimizes collection of dirt and moisture on the lower exposed portion 64 of the tube 13. The lower end 65 of the inner tube 13 is secured to the fork 12 of FIG. 1A in any suitable manner as will be apparent to those skilled in the art.

Figure 3A:
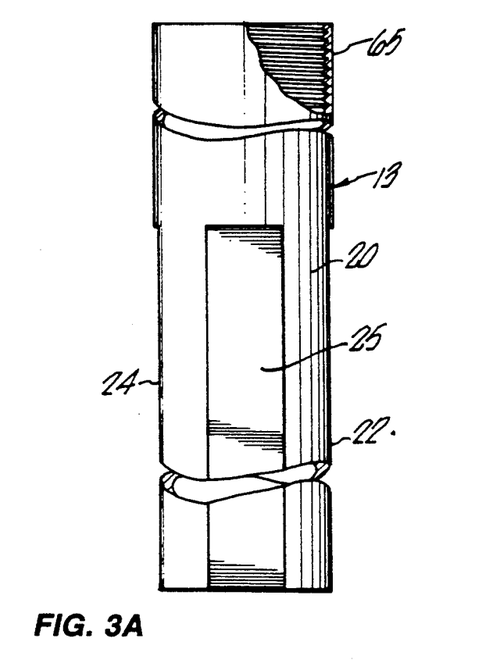
FIG. 3a is a view of the inner steer tube of the assembly of FIG. 2, and FIGS. 3b and 3c are respective end views thereof.
Figure 3B:
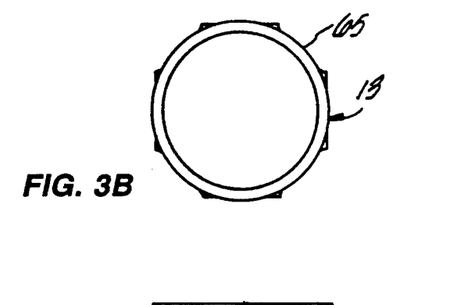
Figure 3C:
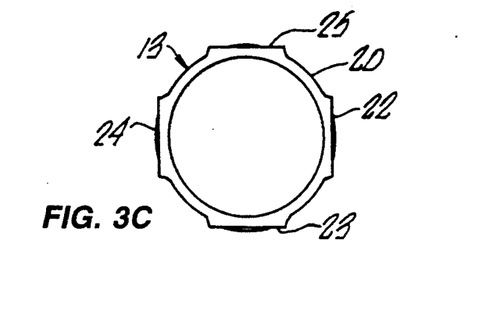

FIGS. 3A-3C illustrates in detail the configuration of the inner tube 13 and FIGS. 4A-4D illustrates in detail the configuration of the outer tube 14. The inner tube 13 is essentially a hollow cylinder as illustrated in FIGS. 2 and 3, but has formed on its outer wall 20 four axially extending longitudinal flat surfaces, or flats, 22 through 25 as previously discussed with reference to FIGS. 1A and 1B. An exemplary outer diameter of the tube 13 is 1.125 inches and an exemplary length of the tube 13 is 8.17 inches, with the flats being 5.67 inches long and one-half inch wide, and the cylindrical end 62 2.5 inches long. The tube 13 is formed of steel, and can be formed from Nitriloy or equivalent, and with the flats 22-25 being hardened through the use of copper masking techniques as used in the automotive industry. Since this tube 13 is the most highly stressed part of the assembly, it is important that it be formed of a material and in a manner such that it will bend rather than break under high stresses.

Figure 4A:
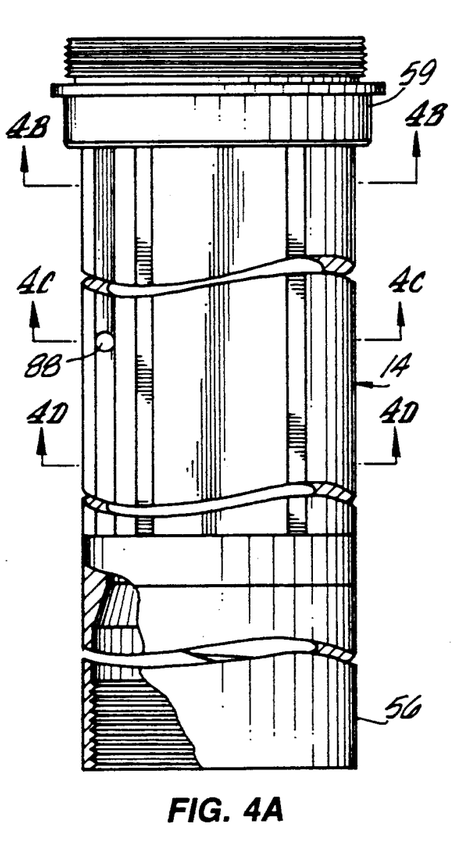
FIG. 4a illustrates the outer steer tube of the assembly of FIG. 2.
Figure 4B:
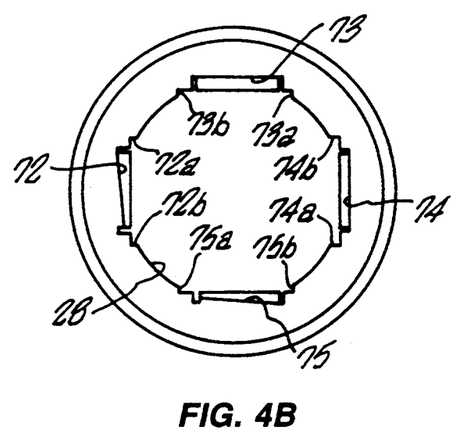
FIG. 4b is an end view and FIGS. 4c–4d are cross-sectional views taken along respective lines 4c–4c and 4d–4d thereof, and these views illustrate an adjustable race arrangement.
Figure 4C:
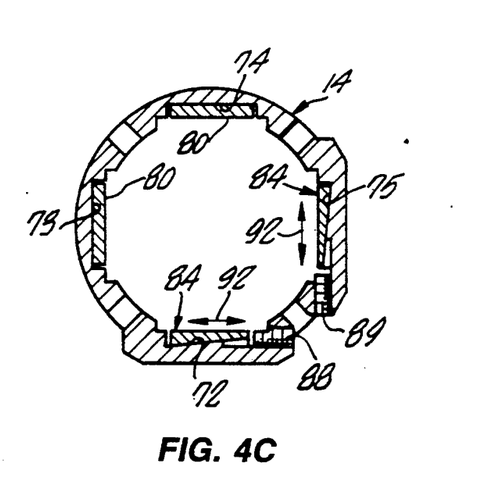
Figure 4D:
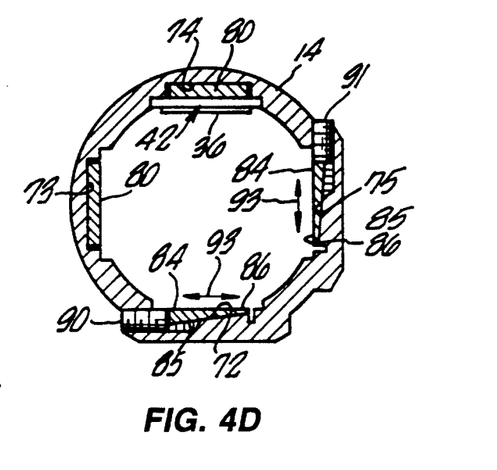
Figure 6A:
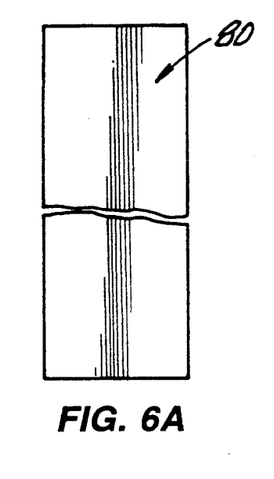
FIGS. 6a and 6b illustrate views of a fixed race used in the assembly of FIG. 2.
Figure 6B:
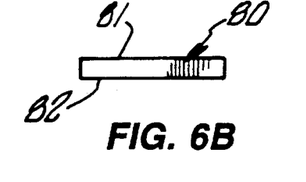
Figure 7A:
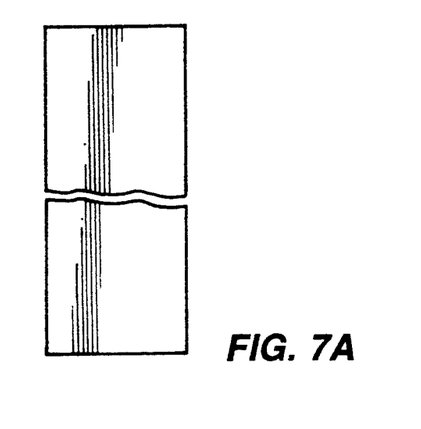
FIGS. 7a and 7b are similar views of an adjustable race used in the assembly shown in FIG. 2.
Figure 7B:
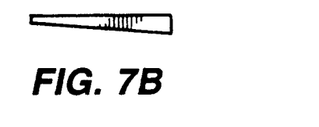

The outer tube 14 as shown in FIGS. 4A-4D comprises a hollow cylinder for mounting in the bearings 16 and 17 within the head tube 11 as previously discussed. The inner wall 28 of this tube has formed therein four longitudinally disposed channels 72- 75 as seen in FIGS. 4b-4d. These channels are formed to receive therein the bearing races 80 and 84 shown in FIGS. 6a-6b and 7. The channels 72-25 also have outer walls 72a-b-75a-b (note FIG. 4b) to receive the bearing cages 42. The race 80 shown in FIG. 6 is termed herein a "fixed" race and has a consistent rectangular cross section with parallel sides or faces 81 and 82 as seen in FIG. 6b. Two of these races 80 are disposed in respective channels 73 and 74. On the other hand, each of the longitudinal channels 72 and 75 receives the race 84 of FIGS. 7A-7B which is termed an "adjustable" race. These adjustable races facilitate assembly and provide a way to adjust bearing clearance after assembly as is explained below. An exemplary length for the tube 14 is 7.66 inches and outer diameter of the central portion is 1.5 inches.

It can be seen in FIGS. 4b-4d that the channels 73 and 74 for the fixed race 80 are not only parallel to the axis of the tube 14 but are perpendicular to a radial line extending through the center of the tube 14.

On the other hand, the channels 72 and 75 are disposed at a slight angle (e.g., approximately 4°) with respect to a normal to a radial line. Furthermore, the adjustable races 84 of FIGS. 7A-7B have a similar inclined side or face 85 which mates with the surfaces of the channels 72 and 75 so that the two inclined surfaces (i.e., 72 and 85 and 75 and 85) mate and cooperate to allow radial adjustment of bearing clearance. Note FIGS. 4c and 4d which are cross-sectional views along the lines 4c-4c and 4d-4d of FIG. 4a and illustrate threaded holes 88-91 for receiving set screws (not shown) to allow a small adjustment of the adjustable races 84 in the direction of the arrows 92 and 93 which, as will be apparent to those skilled in the art, causes the inclined surfaces (i.e., 72 and 85 and 75 and 85) to move along one another thereby causing the normal surfaces 86 of the adjustable races to move radially in and out with respect to the axis of the tube 14 so as to take up bearing clearance. The bearing cages 42 and needle bearings are disposed on the races 80 and 84 (one bearing cage 42 and one needle bearing 36 is shown in FIG. 4D for illustration).

Figures 5A, 5B, 5C, 5D:
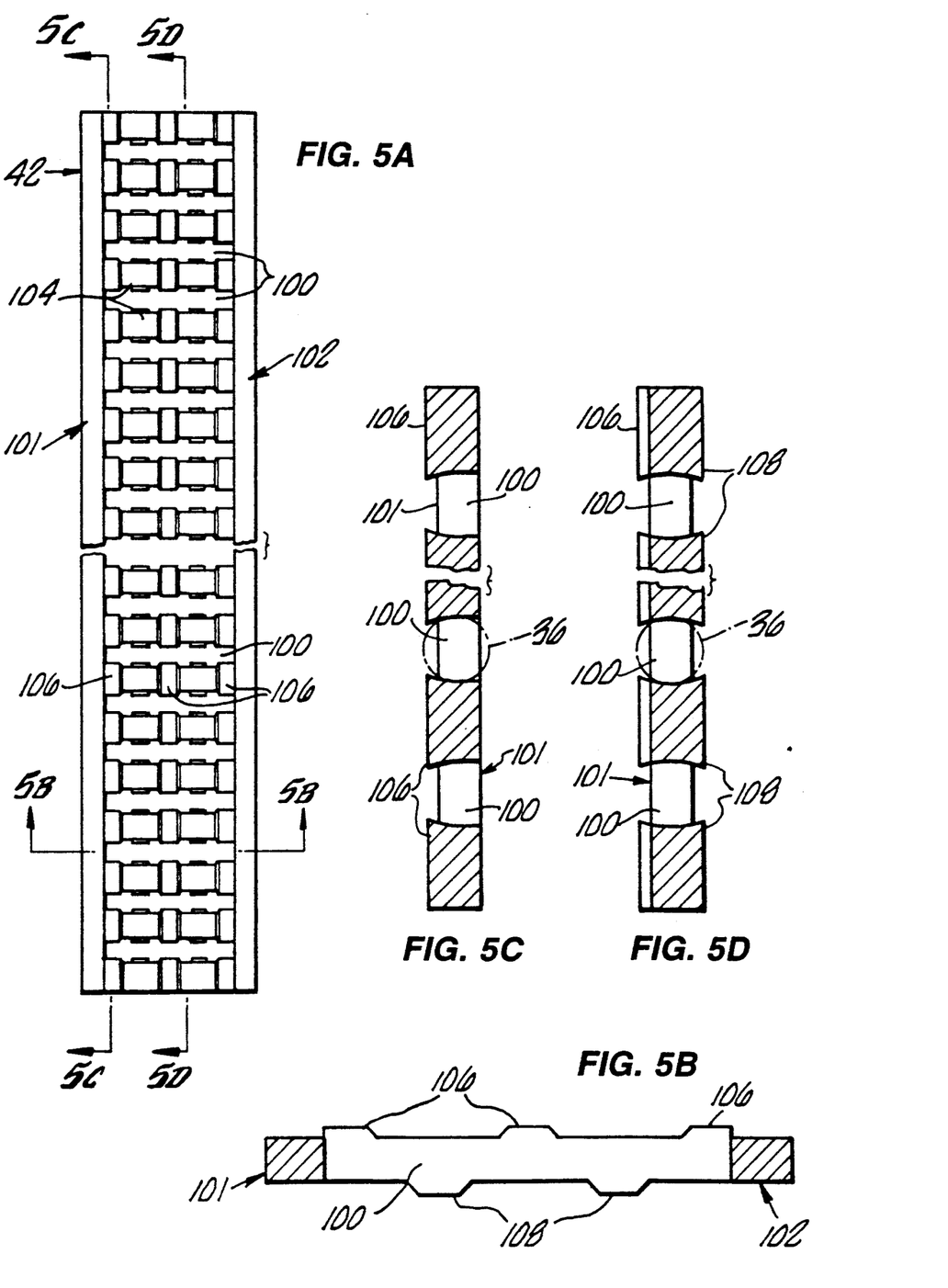

FIGS. 5A-5D and particularly FIG. 5A illustrates the bearing cage 42 that can be used to hold each of the sets of the needle bearings 36-39 between the flats 22-25 of the inner steer tube 13 and the flats provided by the normal surfaces 82 and 86 of the respective races 82 and 84. The bearing cage 42 shown in FIGS. 5A-5D may be molded from a suitable thermalplastic material, and has slots 100 for receiving the needle bearings. The cage includes an outer frame structure 101 and 102 and a plurality of cross-members 104 extending therebetween and forming the needle bearing slots or spaces 100. The cross members 104 are configured as best seen in FIG. 5b-5d, and have inwardly curved upper members 106 (FIG. 5c) and inwardly curved lower members 108 (FIG. 5d) for partially encircling the needle bearings and retaining them within the slots 100. In the present exemplary embodiment, each bearing cage 42 supports sixty-six needle bearings in the slots 100.

ALTERNATIVE BEARING ADJUSTMENT

Figure 8:
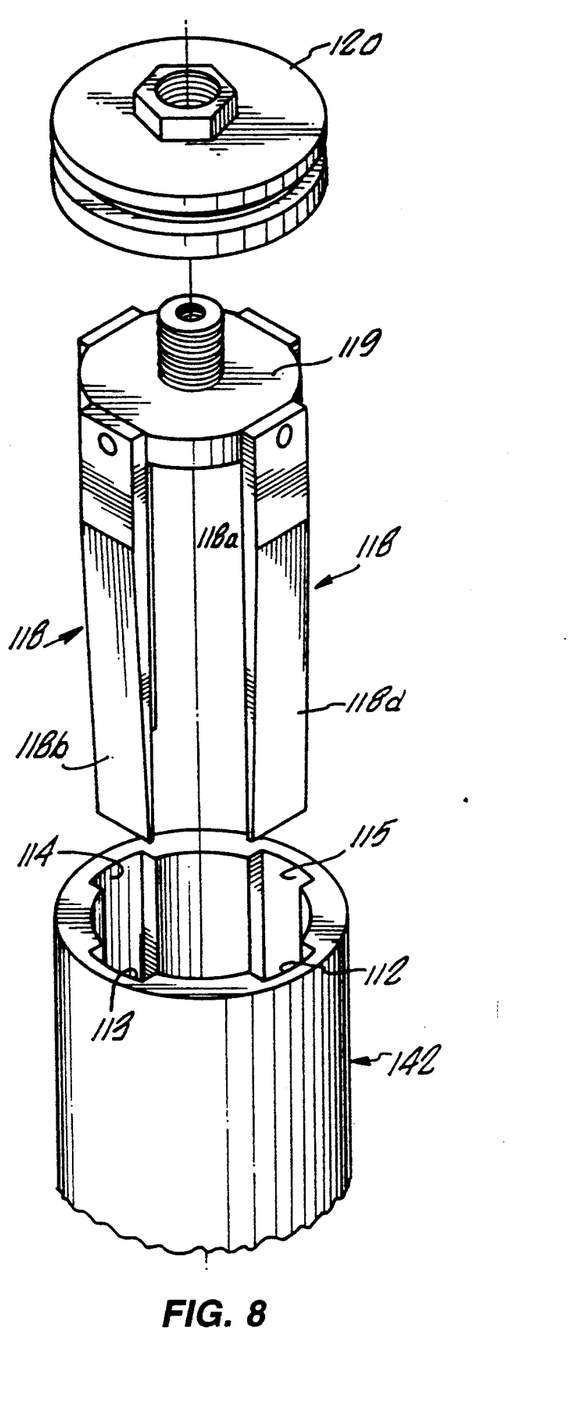
FIG. 8 is a perspective view of an alternative manner for providing an adjustable race for a suspension fork according to the present invention.

Turning now to an alternative embodiment for adjusting bearing clearance, FIG. 8 shows an upper end of an outer steer tube 14a having four axially extending longitudinal channels 112 through 115. Four adjustable races 118 are secured to an upper collar 119 which in turn can be adjustably connected to a cap 120. The cap 120 can be similar to the outer tube cap 50 of FIG. 2, and the handlebar stem (not shown) can be attached to the upper end of the tube 14a.

The races 118 shown in FIG. 8 have inwardly facing flat faces 118a which are disposed normal to a radial line from the center axis of the tube 14a. An inner tube (not shown) is disposed within the outer tube 14a, with mating flats, along with suitable needle bearings and bearing cages similar to the structures previously described.

The opposite outer surfaces 118b of at least two of the races 118 are inclined from top to bottom wherein the upper end is thicker than the lower end as shown. Two or more of the channels 112-115 can have a similar mating relationship wherein these channels are inclined outwardly from the bottom to the top of the tube 14a. With this construction, movement of the set of races 118 downwardly into the tube 14a against the inclined channels 112-115 causes the inner normal surfaces 118a of the inclined races to move radially inward to thereby accommodate and adjust for bearing clearance. This arrangement provides another way for adjusting or compensating for bearing clearance and thus involves movement of some or all of races 118 in an axial direction for bearing compensation.

ALTERNATIVE EMBODIMENT

Figure 9:
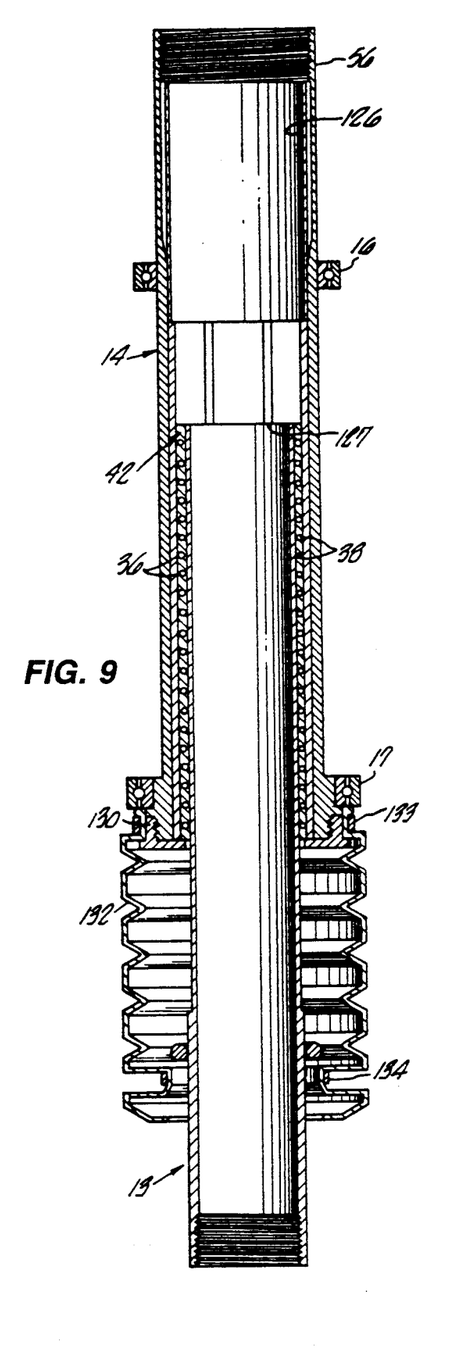
FIG. 9 is a view, similar to FIG. 2, of an alternative suspension assembly which can incorporate an air spring.
Figure 10A:
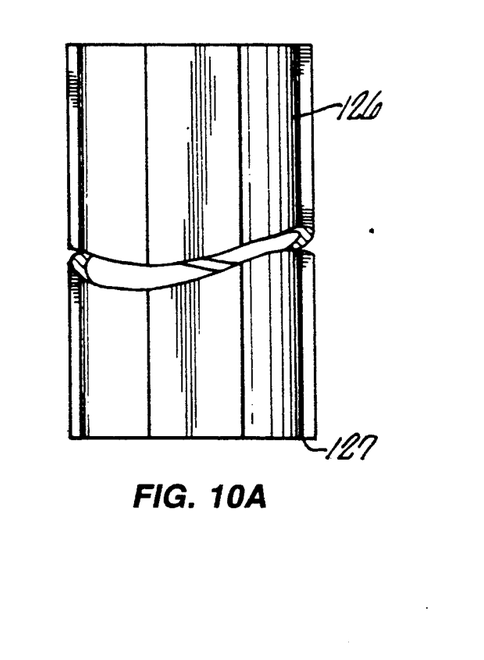
FIG. 10a is a view of a suspension fork race retainer.
Figure 10B:
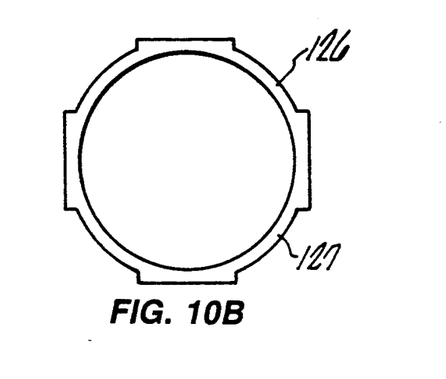
FIG. 10b is an end view thereof, for use in the assembly of FIG. 9.

FIGS. 9 and 10A-10B illustrate an alternative embodiment which is almost the same as that shown in FIG. 2 but which is designed to accommodate an internal air spring system (not shown). In this embodiment, the inner tube 13 and outer tube 14 are like those shown in FIG. 2. Likewise, the assembly is mounted in bearings 16 and 17, and the assembly contains the same four sets of needle bearings 36-39, only two of which 36 and 38 are seen in this Figure. Like bearing cages 42 also are used, but the upper or right hand ends as seen in FIG. 9 are retained by a cylindrical race retainer 126 and which is shown in greater detail in FIG. 10. This race retainer 126 fits within the upper end of the outer steer tube 14, and has a lower end forming a shoulder 127 against which the upper ends of the bearing cages 42 are retained. The race retainer is retained in the upper end 56 of the tube 14 by a tube cap (not shown) and related components similar to the tube cap 50 of FIG. 2. The lower ends of the bearing cages 42 are retained by a collar 130 similar to the collar 58 of FIG. 2. A boot 132 is provided and is retained by cable ties 133-134.

While embodiments of the present invention have been shown and described, various modifications may be made without departing from the scope of the present invention, and all such modifications and equivalents are intended to be covered.

What is claimed is:

1. A suspension fork assembly for bicycles comprising an elongated inner tube and an elongated outer tube coaxially mounted together and adapted to telescope with respect to each other, comprising the inner tube having an outer wall with a plurality of at least three axially extending longitudinal flat surfaces, the outer tube having an inner wall with a like plurality of axially extending longitudinal flat surfaces, a like plurality of sets of needle bearings disposed normal to longitudinal axes of said tubes and between the respective flat surfaces of the outer wall of the inner tube and the flat surfaces of the outer tube, whereby the flat surfaces of the inner and outer tubes in combination with the sets of needle bearings allow the tubes to telescope with respect to each other, and enable torsional steering forces to be transferred from a handlebar adapted to be connected near one end of one of said tubes to a fork adapted to be connected near an end of the other of said tubes, and one or more races positioned between the inner tube and the outer tube, the one or more races having a thickness which is adjustable to provide a desired radial clearance for the needle bearings.

2. A suspension fork as in claim 1 wherein said plurality of at least three axially extending longitudinal flat surfaces comprises four flat surfaces on each of said inner and outer tubes and four sets of needle bearings.

3. A suspension fork as in claim 1 wherein the inner wall of the outer tube comprises a plurality of axially extending longitudinal channels, the one or more races being disposed in the longitudinal channels.

4. A suspension fork assembly according to claim 1 wherein each of the one or more races has a thickness which varies, whereby changing the position of the race adjusts the clearance for the needle bearings.

5. A suspension fork assembly for bicycles comprising an elongated inner tube and an elongated outer tube coaxially mounted together and adapted to telescope with respect to each other, comprising the inner tube having an outer wall with a plurality of at least three axially extending longitudinal flat surfaces, the outer tube having an inner wall with a like plurality of axially extending longitudinal flat surfaces, a like plurality of sets of needle bearings disposed normal to longitudinal axes of said tubes and between the respective flat surfaces of the outer wall of the inner tube and the flat surfaces of the outer tube, whereby the flat surfaces of the inner and outer tubes in combination with the sets of needle bearings allow the tubes to telescope with respect to each other, and enable torsional steering forces to be transferred from a handlebar adapted to be connected near one end of one of said tubes to a fork adapted to be connected near an end of the other of said tubes, races disposed between the inner tube and the outer tube, means for adjusting thickness of at least one of said races to adjust for clearance between the inner tube and the outer tube, and a shock absorbing system disposed within and coupled between said inner and outer tubes.

6. A suspension fork assembly for bicycles comprising an elongated inner tube and an elongated outer tube coaxially mounted together and adapted to telescope with respect to each other, comprising the inner tube having an outer wall with a plurality of at least three axially extending longitudinal flat surfaces, the outer tube having an inner wall with a like plurality of axially extending longitudinal flat surfaces, and a like plurality of sets of needle bearings disposed normal to longitudinal axes of said tubes and between the respective flat surfaces of the outer wall of the inner tube and the flat surfaces of the outer tube, whereby the flat surfaces of the inner and outer tubes in combination with the sets of needle bearings allow the tubes to telescope with respect to each other, and enable torsional steering forces to be transferred from a handlebar adapted to be connected near one end of one of said tubes to a fork adapted to be connected near the end of the other of said tubes, wherein the inner wall of the outer tube comprises a plurality of axially extending longitudinal channels having a like plurality of races disposed in the longitudinal channels of the outer tube, wherein the plurality of at least three axially extending longitudinal flat surfaces comprises four bearing races on each of said inner and outer tubes and four sets of needle bearings and said channels comprise four channels and said bearing members comprise four bearing members, two of the bearing members comprising elongated strips having parallel faces and adapted to be disposed in two of the respective channels normal to a radial line extending from the axis of the outer tube, and two of which comprise elongated strips having a first inwardly facing flat face disposed normal to a radial line extending from the axis of the outer tube and an outer face inclined with respect to the inwardly facing face thereof and cooperating with a mating inclined surface of two respective of said channels to enable adjustment of said latter two elongated strips to adjust bearing clearance.

7. A suspension fork as in claim 6 further including a shock absorbing system disposed within and coupled between said inner and outer tubes.

8. An axial and radial loading bearing suspension and steering assembly for vehicles and the like comprising an elongated inner tube and an elongated outer tube coaxially mounted together and adapted to telescope but not rotate with respect to each other, comprising the inner tube having an outer wall with a plurality of at least three axially extending longitudinal flat surfaces, the outer tube having an inner wall with a like plurality of axially extending longitudinal flat surfaces, a like plurality of sets of needle bearings disposed normal to longitudinal axes of the inner and outer tubes and between ad adjacent the respective flat surfaces of the outer wall of the inner tube and the flat surfaces of the outer tube, whereby the flat surfaces of the inner and outer tubes in combination with the sets of needle bearings allow the tubes to telescope but not rotate with respect to each other and the bearings to individually rotate with respect to the longitudinal axes of said tubes, and enable torsional steering forces to be transferred from a member adapted to be connected near one end of one of said tubes to another member adapted to be connected near an end of the other of said tubes, and one or more races positioned between the inner tube and the outer tube, the thickness of the one or more races being adjustable to provide a desired radial clearance for the needle bearings.

9. A suspension and steering assembly as in claim 8 wherein said plurality of at least three axially extending longitudinal flat surfaces comprises four flat surfaces on each of said inner and outer tubes and four sets of needle bearings.

10. A suspension and steering assembly as in claim 8 wherein the inner wall of the outer tube comprises a plurality of at least three axially extending longitudinal channels having a like plurality of said races disposed therein.

11. A suspension and steering assembly according to claim 8 wherein each of the one or more races has a thickness which varies from, whereby changing the position of the race adjusts the clearance for the needle bearings.

12. An axial and radial load bearing suspension and steering assembly for vehicles and the like comprising an elongated inner tube and an elongated outer tube coaxially mounted together and adapted to telescope but not rotate with respect to each other, comprising the inner tube having an outer wall with a plurality of at least three axially extending longitudinal flat surfaces, the outer tube having an inner wall with a like plurality of axially extending longitudinal flat surfaces, a like plurality of sets of needle bearings disposed normal to longitudinal axes of said tubes and between and adjacent the respective flat surfaces of the outer wall of the inner tube and the flat surfaces of the outer tube, whereby the flat surfaces of the inner and outer tubes in combination with the sets of needle bearings allow the tubes to telescope but not rotate with respect to each other and the bearings to individually rotate with respect to the longitudinal axes of said tubes, and enable torsional steering forces to be transferred from a member adapted to be connected near one end of one of said tubes to another member adapted to be connected near an end of the other of said tubes, a plurality of races disposed between the inner tube and the outer tube, means for adjusting thickness of at least one of said races to adjust for clearance between the inner tube and the outer tube, and a shock absorbing system disposed within and coupled between said inner and outer tubes.

13. An axial and radial load bearing suspension and steering assembly for vehicles and the like comprising an elongated inner tube and an elongated outer tube coaxially mounted together and adapted to telescope but not rotate with respect to each other, comprising the inner tube having an outer wall with a plurality of at least three axially extending longitudinal flat surfaces, the outer tube having an inner wall with a like plurality of axially extending longitudinal flat surfaces, and a like plurality of sets of needle bearings disposed normal to longitudinal axes of said tubes and between and adjacent the respective flat surfaces of the outer wall of the inner tube and the flat surfaces of the outer tube, whereby the flat surfaces of the inner and outer tubes in combination with the sets of needle bearings allow the tubes to telescope but not rotate with respect to each other and the needle bearings to individually rotate with respect to the longitudinal axes of said tubes, and enable torsional steering forces to be transferred from a member adapted to be connected near one end of one of said tubes to another member adapted to be connected near the end of the other of said tubes, wherein the inner wall of the outer tube comprises a plurality of at least three axially extending longitudinal channels having a like plurality of said races disposed therein, wherein the plurality of at least three axially extending longitudinal flat surfaces comprises four of said races on each of said inner and outer tubes and four sets of needle bearings, and said channels comprise four channels and said needle bearings comprise four needle bearings, two of the needle bearings comprising a first two strip members having parallel faces and adapted to be disposed in two of the respective channels normal to a radial line extending from the axis of the outer tube, and two of which comprise a second two strip members having a first inwardly facing flat face disposed normal to a radial line extending from the axis of the outer tube and an outer face inclined with respect to the inwardly facing face thereof and each cooperating with a mating surface of each of two respective of said channels to enable adjustment of said second two strip members to adjust bearing clearance.

14. A suspension and steering assembly as in claim 13 further including a shock absorbing system disposed within and coupled between said inner and outer tubes.

15. A suspension and steering assembly as in claim 13 wherein said plurality of at least three axially extending longitudinal flat surfaces comprises four flat surfaces on each of said inner and outer tubes and four sets of needle bearings.

16. A suspension and steering assembly as in claim 13 wherein said second two strip members can be adjusted in a direction perpendicular to two of the respective axially extending longitudinal flat surfaces of the outer tube.

17. A suspension and steering assembly as in claim 13 wherein the second two strip members can be adjusted parallel to two of the respective axially extending longitudinal flat surfaces.

18. An axial and radial load bearing suspension and steering assembly for vehicles and the like comprising an elongated inner tube and an elongated outer tube coaxially mounted together and adapted to telescope but not rotate with respect to each other, comprising the inner tube having an outer wall with a plurality of at least three axially extending longitudinal flat surfaces, the outer tube having an inner wall with a like plurality of axially extending longitudinal flat surfaces, a like plurality of cages and a like plurality of sets of needle bearings in the cages, the cages disposed normal to longitudinal axes of said tubes and between and adjacent the respective flat surfaces of the outer wall of the inner tube and the flat surfaces of the outer tube, whereby the flat surfaces of the inner and outer tubes in combination with the sets of needle bearings allow the tubes to telescope but not rotate with respect to each other and the bearings to individually rotate with respect to the longitudinal axes of said tubes, and enable torsional steering forces to be transferred from a member adapted to be connected near one end of one of said tubes to another member adapted to be connected near an end of the other of said tubes, the inner wall of the outer tube comprises a plurality of axially extending longitudinal channels having a plurality of bearing races disposed therein, the bearing races having adjustable thickness to provide a desired radial clearance for the needle bearings.

19. A suspension and steering assembly according to claim 18 wherein each of the bearing race members has a thickness which varies, whereby changing the position of the bearing race member adjusts the clearance for the needle bearings.

20. An axial and radial load bearing suspension and steering assembly for vehicles and the like comprising an elongated inner tube and an elongated outer tube coaxially mounted together and adapted to telescope but not rotate with respect to each other, comprising the inner tube having an outer wall with a plurality of at least three axially extending longitudinal flat surfaces, the outer tube having an inner wall with a like plurality of axially extending longitudinal flat surfaces, a like plurality of sets of needle bearings in cages disposed normal to longitudinal axes of said tubes and between and adjacent the respective flat surfaces of the outer wall of the inner tube and the flat surfaces of the outer tube, whereby the flat surfaces of the inner and outer tubes in combination with the sets of needle bearings allow the tubes to telescope but not rotate with respect to each other and the bearings to individually rotate with respect to the longitudinal axes of said tubes, and enable torsional steering forces to be transferred from a member adapted to be connected near one end of one of said tubes to another member adapted to be connected near the end of the other of said tubes, the inner wall of the outer tube comprises a plurality of axially extending longitudinal channels having a plurality of adjustable bearing races disposed therein, and a shock absorbing system disposed within and coupled between said inner and outer tubes.

21. A suspension and steering assembly in claim 20 comprising four flat surfaces on each of said inner and outer tubes and four sets of needle bearings.

* * * * *